United States Patent
Saikawa et al.

(10) Patent No.: US 8,018,673 B2
(45) Date of Patent: Sep. 13, 2011

(54) DISK DRIVE, METHOD FOR MEASURING CLEARANCE AND METHOD FOR WRITING SERVO PATTERNS

(75) Inventors: Manabu Saikawa, Kanagawa (JP); Atsushi Takeichi, Kanagawa (JP); Yuki Hashimoto, Kanagawa (JP); Kenji Kuroki, Kanagawa (JP); Mitsuhiro Shoda, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/618,685

(22) Filed: Nov. 13, 2009

(65) Prior Publication Data
US 2010/0123970 A1    May 20, 2010

(30) Foreign Application Priority Data
Nov. 14, 2008    (JP) .................. 2008-292850

(51) Int. Cl.
*G11B 21/02* (2006.01)
*G11B 27/36* (2006.01)
(52) U.S. Cl. .......................... 360/75; 360/31
(58) Field of Classification Search ........... None
See application file for complete search history.

(56) References Cited

U.S. PATENT DOCUMENTS

| 7,088,532 B1 * | 8/2006 | Krajnovich et al. | 360/25 |
| 7,630,162 B2 * | 12/2009 | Zhao et al. | 360/75 |
| 7,719,785 B2 * | 5/2010 | Taniguchi et al. | 360/75 |
| 2008/0030888 A1 | 2/2008 | Brunnett et al. | |

FOREIGN PATENT DOCUMENTS
JP    2006269005    10/2006

* cited by examiner

*Primary Examiner* — K. Wong

(57) ABSTRACT

A disk drive. The disk drive includes a plurality of head-sliders, an actuator, a plurality of clearance adjustment sections, and a controller. Each head-slider includes a slider and a magnetic-recording head on the slider for accessing a disk for storing data. The plurality of head-sliders is secured to the actuator that is configured to move the plurality of head-sliders concurrently. Each clearance adjustment section corresponds to each head-slider of the plurality of head-sliders and adjusts a clearance of the corresponding head-slider. In addition, the controller is configured to position the actuator by servo control with a first head-slider selected from the plurality of head-sliders, to change a clearance of a second head-slider different from the first head-slider by controlling a clearance adjustment section of the second head-slider to bring the second head-slider into contact with a disk, and to detect the contact to measure the clearance of the second head-slider.

17 Claims, 6 Drawing Sheets

DISK DRIVE, METHOD FOR MEASURING CLEARANCE AND METHOD FOR WRITING SERVO PATTERNS

CROSS-REFERENCE TO RELATED APPLICATION

This application claims priority from the Japanese Patent Application No. 2008-292850, filed Nov. 14, 2008 the disclosure of which is incorporated herein in its entirety by reference.

TECHNICAL FIELD

Embodiments of the present invention relate to a disk drive, a method for writing servo patterns, and a method for determining a clearance control value suitable for adjusting fly height in servo writing.

BACKGROUND

A hard-disk drive (HDD) positions a head-slider by servo control using servo patterns on a magnetic-recording disk and writes, or alternatively, reads, data at an address designated by a host. An operation for writing servo patterns to magnetic-recording disks is called servo writing; and, servo writing is generally performed in the manufacturing of HDDs. As one type of a servo write operation, self-servo writing (SSW) is known in the art; SSW reads out data written by the HDD for head-slider positioning and timing control to write servo patterns to magnetic-recording disks.

For writing new servo patterns to a magnetic-recording disk in SSW, a HDD writes servo patterns for head-slider positioning and timing patterns for measuring the timing of writing new servo patterns. The servo patterns written by the HDD typically include two types of servo patterns: servo patterns used in read and write operations corresponding to commands from a host, which are referred to herein by the term of art "product servo patterns" that are further described herein, and servo patterns used only for the servo control in SSW. As described herein, servo patterns are patterns for head-slider positioning, which is associated with actuator positional control, including both types of servo patterns.

SSW performs timing control by timing patterns to write new servo tracks while reading out servo patterns written by the HDD itself for head-slider positioning, which is associated with actuator positional control. The HDD repeats such a propagation process of servo patterns. A read element and a write element on a head-slider are located at different radial positions of the magnetic-recording disk and the read element can read servo patterns written by the write element. Typically, the read element is located closer to an inside diameter (ID) of the magnetic-recording disk than the write element, and the read element reads servo patterns written by the write element and the write element writes a new servo track closer to an outside diameter (OD) of the magnetic-recording disk.

The clearance between a magnetic-recording disk and a magnetic-recording head, which includes a read element and a write element, flying in proximity to the recording surface of the magnetic-recording disk is reduced; and, variations in the clearance are also reduced to increase the recording density of the magnetic-recording disk. To this end, some mechanisms to adjust the clearance have been proposed. One of these mechanisms employs a heater in a magnetic-recording head and adjusts the clearance by heating the magnetic-recording head with the heater. As used herein, this mechanism is referred to by the term of art, "thermal fly-height control" (TFC). TFC supplies the heater with current to liberate heat and protrudes the magnetic-recording head by thermal expansion. TFC reduces the clearance between the magnetic-recording disk and the magnetic-recording head. In addition, another mechanism is known in the art to adjust the clearance between the magnetic-recording disk and the magnetic-recording head with a piezoelectric element.

Engineers and scientists engaged in HDD manufacturing and development are interested in servo writing methodologies and systems utilized by HDDs that can increase the recording density of information stored on a magnetic-recording disk, to meet the demands of the marketplace for performance and reliability of HDDs.

SUMMARY

Embodiments of the present invention include a disk drive. The disk drive includes a plurality of head-sliders, an actuator, a plurality of clearance adjustment sections, and a controller. Each head-slider includes a slider and a magnetic-recording head on the slider for accessing a disk for storing data. The plurality of head-sliders is secured to the actuator that is configured to move the plurality of head-sliders concurrently. Each clearance adjustment section corresponds to each head-slider of the plurality of head-sliders and adjusts a clearance of the corresponding head-slider. In addition, the controller is configured to position the actuator by servo control with a first head-slider selected from the plurality of head-sliders, to change a clearance of a second head-slider different from the first head-slider by controlling a clearance adjustment section of the second head-slider to bring the second head-slider into contact with a disk, and to detect the contact to measure the clearance of the second head-slider.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
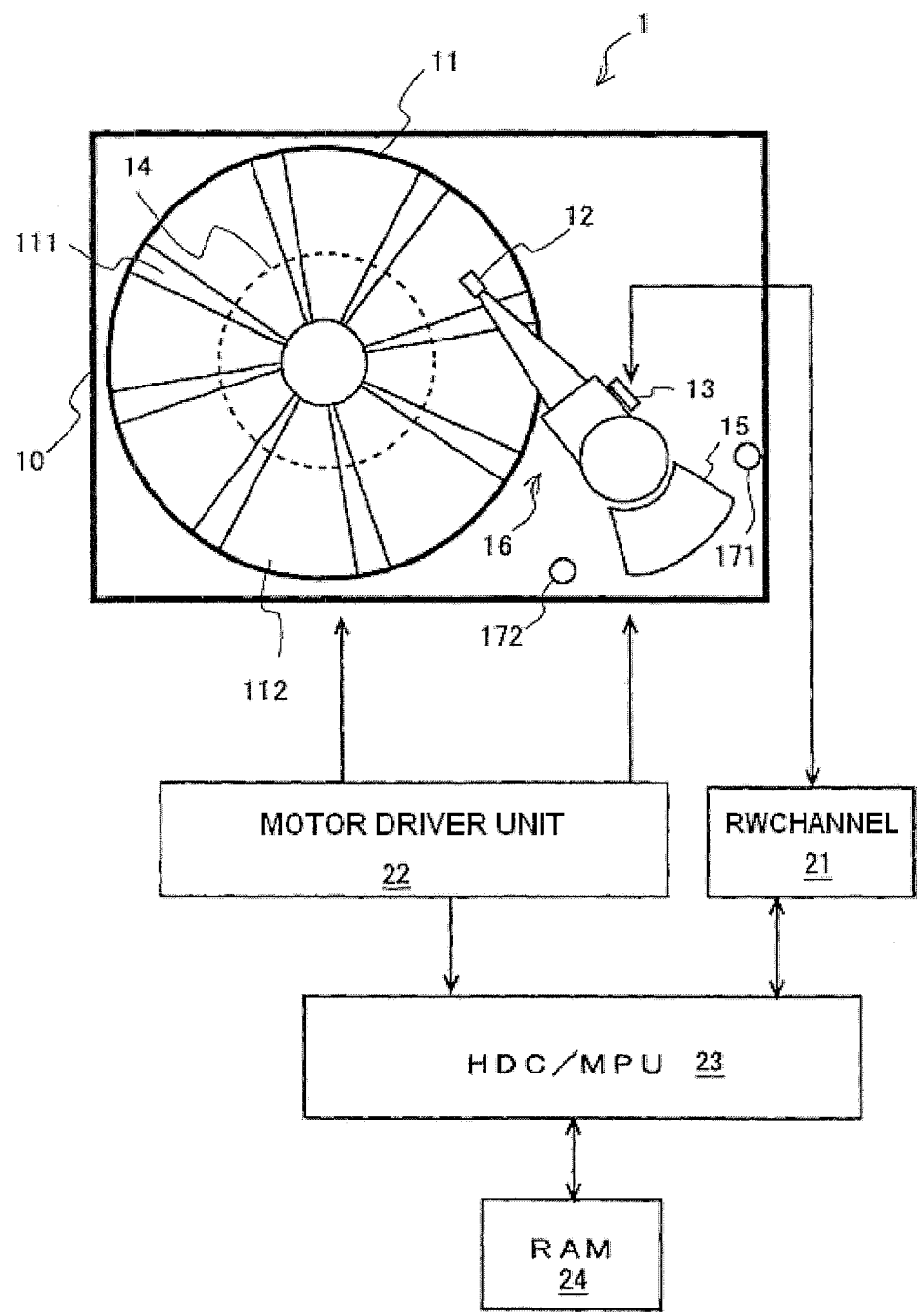
FIG. 1 is a block diagram schematically depicting the configuration of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Disk Drive, a Method for Measuring Clearance, and a Method for Writing Servo Patterns With relevance to embodiments of the present invention, to increase data track density, servo track density is increased in order to enhance head-slider positioning accuracy. To this end, the clearance between the magnetic-recording disk and the magnetic-recording head in servo track writing is adjusted to perform head-slider positioning and writing servo patterns at appropriate clearance.

Manufacturing tolerances are defined in manufacturing head-sliders and suspensions. Therefore, head-sliders mounted in a HDD have different clearances when heaters are off. Thus, each heater is provided with appropriate heater power in servo writing.

In order to determine appropriate heater power for each head-slider, the clearance between each magnetic-recording head and a magnetic-recording disk is measured. One of the clearance measurement methods increases heater power to protrude a magnetic-recording head and measures the heater power to bring the magnetic-recording head into contact with a magnetic-recording disk. Heater power which is slightly smaller than the heater power at which the head-slider contacts the magnetic-recording disk achieves servo writing at small clearance without contact between the head-slider and the magnetic-recording disk.

The clearance for each head-slider is measured in order to supply appropriate heater power to each head-slider. Conventional clearance measurement controls an actuator with servo signals read by a head-slider of object to be measured and moves the head-slider to a specific target position and measures the clearance of the object to be measured.

In order to control clearance in servo writing, the clearance for each head-slider is measured in an initial-stage process before starting to write product servo patterns used in head-slider positioning in a product. As no servo patterns are located on a recording surface of a magnetic-recording disk before a write element of a magnetic-recording head writes servo patterns, the HDD can not carry out head-slider positioning by servo patterns on the magnetic-recording disk. Thus, in self-servo writing (SSW), a HDD positions a head-slider in proximity to the recording surface of the magnetic-recording disk using a crash stop.

The HDD applies a constant current to a voice-coil motor (VCM) driving an actuator supporting a head-slider to push the actuator into an inner crash stop firmly. The actuator stays at a position where the VCM drive force and the elastic force of the inner crash stop are in balance. The HDD maintains the constant VCM current and writes servo patterns with a write element to write a servo track.

If the VCM current is reduced, namely, the VCM drive force is reduced, the elastic force of the inner crash stop becomes larger than the VCM drive force and the actuator and the head-slider supported thereby move outward, while remaining in proximity to the recording surface of the magnetic-recording disk. The actuator stops at a position where the VCM drive force and the elastic force of the inner crash stop are in balance.

As described above, the read element may be located closer to the inside diameter (ID) of the magnetic-recording disk than the write element. If the VCM current is reduced gradually, the read element moves gradually toward the outside diameter (OD) and reaches a previously written servo track. The HDD performs the servo control of the actuator, which is associated with head-slider positioning, by use of servo patterns read by the read element. The HDD writes outer servo tracks repeating such a process.

In order to measure the clearance for each head-slider by conventional methods in the initial process in servo writing, a HDD needs to perform, for each head-slider, operations for moving an actuator to an inner crash stop, writing servo patterns with the actuator pushed to the crash stop and measuring the clearance for the head-slider. These operations consume lots of processing time.

Some servo writing processes write servo patterns corresponding to burst patterns and dedicated to servo writing before starting an operation to write product servo patterns used by a product HDD. If these servo writing processes cannot position a head-slider at a designated location right after head-slider switching, the servo writing processes move an actuator to an inner crash stop and move the head-slider to be measured outward following servo tracks.

In other SSW processes that write servo patterns, including the track identification, of the same format as a product servo pattern in the initial stage, usual SSW does not perform servo control with the track number of a written servo track, so that SSW cannot carry out head-slider switching with an actuator maintained at a radial position. Thus, even if servo patterns have already been written, a HDD moves an actuator to an inner crash stop and moves the head-slider to be measured outward following servo tracks.

Embodiments of the present invention provide a methodology to measure clearance efficiently to control the clearance for each head-slider in servo writing. In addition, embodiments of the present invention measure clearance precisely and efficiently in clearance measurement for head-sliders in a test operation or startup process of a HDD.

In accordance with embodiments of the present invention, a disk drive includes a plurality of head-sliders each including a slider and a magnetic-recording head on the slider for accessing a disk for storing data, an actuator to which the plurality of head-sliders are secured for moving the plurality of head-sliders concurrently, a plurality of clearance adjustment sections each corresponding to each head-slider of the plurality of head-sliders and configured to adjust a clearance of the corresponding head-slider, and a controller. In accordance with embodiments of the present invention, the controller is configured to position the actuator by servo control with a first head-slider selected from the plurality of head-sliders, to change a clearance of a second head-slider different from the first head-slider by controlling a clearance adjustment section of the second head-slider to bring the second head-slider into contact with a disk, and to detect the contact to measure the clearance of the second head-slider. Thus, embodiments of the present invention provide efficient clearance measurement.

In one embodiment of the present invention, the controller is further configured to measure a clearance of a third head-slider different from the first head-slider and the second head-slider with the actuator positioned by servo control with the first head-slider. Thus, embodiments of the present invention provide more efficient clearance measurement.

In another embodiment of the present invention, the controller is configured to measure the clearances of all the plurality of head-sliders with the actuator positioned by servo control with the first head-slider. Thus, embodiments of the present invention provide more efficient clearance measurement. Furthermore, in another embodiment of the present invention, the controller is configured to measure the clearances of all the plurality of head-sliders with the actuator maintained positioned at a radial position. Thus, embodiments of the present invention provide more precise clearance measurement.

In one embodiment of the present invention, the controller is configured to detect the contact by monitoring a value of current to a motor driving the actuator. Thus, embodiments of the present invention provide more precise contact detection when the head-slider for servo control is different from the head-slider for clearance measurement.

In another embodiment of the present invention, the controller is configured: to perform and to control servo pattern writing to a disk with the plurality of head-sliders, to write product servo patterns indicating addresses of user data to a disk while controlling the actuator by servo control with a head-slider selected from the plurality of head-sliders, to perform a clearance measurement of the second head-slider before the writing of the product servo patterns, and to control the clearance adjustment section of the second head-slider according to the clearance measurement in writing the product servo patterns. Thus, embodiments of the present invention provide more precise servo pattern writing and reduction in the servo write process time.

In another embodiment of the present invention, the actuator is configured to rotate on a pivot shaft to move the plurality of head-sliders, the controller is configured to start servo pattern writing with the actuator pushed into a crash stop defining a range of rotation of the actuator before starting to write the product servo patterns, and the controller is configured to perform the clearance measurement with the actuator being separated from the crash stop. Thus, embodiments of the present invention provide more precise servo control in the clearance measurement.

In one embodiment of the present invention, the controller is configured to write product servo patterns indicating addresses of user data to recording surfaces of respective magnetic-recording disks with the plurality of head-sliders while controlling the actuator by servo control with the first head-slider. Thus, embodiments of the present invention provide more precise clearance measurement and reduction in the process time.

Embodiments of the present invention include a method for measuring a clearance of a head-slider in a disk drive equipped with a plurality of head-sliders and an actuator for holding and moving the plurality of head-sliders. The method selects a first head-slider from a plurality of head-sliders. The method positions an actuator with servo signals the first head-slider reads from a disk. The method changes the clearance of a second head-slider different from the first head-slider to bring the second head-slider in contact with a disk. The method detects the contact to measure the clearance of the second head-slider. Thus, embodiments of the present invention provide efficient clearance measurement.

Embodiments of the present invention also include a method for writing servo patterns on recording surfaces of the respective magnetic-recording disks with a plurality of head-sliders in a disk drive equipped with the plurality of head-sliders and an actuator for holding and moving the plurality of head-sliders. The method selects a first head-slider from a plurality of head-sliders. The method changes sequentially the clearance of head-sliders of the plurality of head-sliders to bring the plurality of head-sliders into contact with a disk and detecting sequentially the contact of the plurality head-sliders to measure the clearance of the plurality head-sliders, with an actuator positioned with servo signals that the first head-slider reads from a disk. The method writes product servo patterns indicating addresses of user data to a disk with the plurality of head-sliders concurrently while controlling the actuator by servo control with a head-slider selected from the plurality of head-sliders. The method controls the clearance of each of the head-sliders according to measurement of the clearance in writing the product servo patterns. Thus, embodiments of the present invention provide more precise servo pattern writing and reduction in the servo write process time.

Thus, embodiments of the present invention allow a disk drive with a plurality of head-slider to measure the clearance efficiently for the head-sliders. In accordance with embodiments of the present invention, examples are subsequently described in the environment of a hard disk drive (HDD), as an example of a disk drive.

In accordance with embodiments of the present invention, a HDD writes servo patterns on a magnetic-recording disk by SSW. In one embodiment of the present invention, SSW reads servo patterns on a disk with a read element on a head-slider mounted in a HDD and positions an actuator similarly mounted at a target position by servo control. In another embodiment of the present invention, the read element and the write element are located on a head-slider at different radial positions. In another embodiment of the present invention, the HDD writes servo patterns to the disk with the write element on the head-slider. In another embodiment of the present invention, the HDD can write servo patterns over the recording surface of the magnetic-recording disk by repeating the above operations.

In accordance with embodiments of the present invention, patterns on a magnetic-recording disk used in servo control for head-slider positioning are called servo patterns. In one embodiment of the present invention, SSW writes product servo patterns on a magnetic-recording disk, which are servo patterns for reading and writing user data in response to commands from a host, and servo patterns used in servo control for writing product servo patterns, as well.

In an embodiment of the present invention, a controller that is implemented in a product HDD controls and performs SSW. In another embodiment of the present invention, a servo write controller dedicated to manufacturing HDDs may perform a similar process. In accordance with embodiments of the present invention, a disk drive with either controller to control servo writing is considered to be a HDD.

Embodiments of the present embodiment include a clearance measurement that is particularly effective in servo writing. In an embodiment of the present invention, a HDD controls the clearance between a magnetic-recording head and a magnetic-recording disk for each head-slider. In another embodiment of the present invention, the HDD controls the clearance for each head-slider in servo writing. In another embodiment of the present invention, the HDD allows reading and writing servo patterns at smaller clearance, as a result, servo patterns can be written more precisely onto a magnetic-recording disk.

Furthermore, in accordance with embodiments of the present invention, the HDD measures the clearance of each head-slider in an initial process before writing product servo patterns. Specifically, in one embodiment of the present invention, the HDD decreases the clearance gradually and detects contact between a head-slider and a magnetic-recording disk to measure the clearance. In this embodiment of the present invention, the HDD reads servo patterns by a selected head-slider for servo control when measuring the clearance for another head-slider. In another embodiment of the present invention, the clearance measurement for a plurality of head-sliders under servo control with a single head-slider achieves reduction in the processing time of clearance measurement for all head-sliders.

With reference now to FIG. 1, in accordance with embodiments of the present invention, the configuration of a HDD for SSW is next described. A HDD 1 includes a circuit board affixed outside of a disk enclosure (DE) 10. On the circuit board, circuits such as a read and write channel (RW channel) 21, a motor driver unit 22, an integrated circuit (IC) including a hard-disk controller/microprocessor unit (HDC/MPU) 23 of a hard disk controller (HDC) and a microprocessor unit (MPU), and a random access memory (RAM) 24 of a semiconductor memory are arranged. The above-described number of IC chips for implementing those circuits is by way of example without limitation thereto.

In the DE 10, a spindle motor (SPM) 14 spins a magnetic-recording disk 11, a disk for storing data, at a specific angular rate. FIG. 1 depicts the magnetic-recording disk 11 with product servo patterns already written. Multiple servo areas 111 extending in the radial direction from the center of the magnetic-recording disk 11 and being located discretely at specified angles are formed on a recording surface of the magnetic-recording disk 11. Product servo patterns for positioning a head-slider in access to user data are stored in the servo area 111. A data area 112 is formed between two adjacent servo areas 111; and, the data area 112 stores user data. The servo areas 111 and the data areas 112 are arranged alternately at given angles.

Although FIG. 1 depicts only one head-slider 12, in accordance with an embodiment of the present invention, the HDD 1 employs a plurality of head-sliders. Each head-slider 12 includes a slider for flying in proximity to the recording surface of the magnetic-recording disk 11 and a magnetic-recording head, and a magnetic-recording head for reading data from, and writing data to, the magnetic-recording disk 11. The head-sliders 12 are secured at a distal end of an actuator 16. The actuator 16 is connected to a VCM 15 and rotates on a pivot shaft to move the head-sliders 12 in proximity with the recording surface of the spinning magnetic-recording disk 11 along the radial direction. The range of motion of the actuator 16 is restricted by an inner crash stop 171 and an outer crash stop 172 with elastic bodies around the surfaces.

The motor driver unit 22 drives the SPM 14 and the VCM 15 according to control data from HDC/MPU 23. An arm-electronics (AE) module 13 amplifies read-back and write signals. The head-slider 12 includes a heater element to control the clearance and the AE module 13 supplies heater power according to indications from HDC/MPU 23. The RW channel 21, in read operation, extracts servo data and user data from read-back signals obtained from the AE module 13 and decodes the read-back signals to transfer the decoded data to HDC/MPU 23. The RW channel 21, in write operation, code-modulates the write data supplied from HDC/MPU 23, converts the code-modulated data into write signals, and then supplies the write signals to the AE module 13.

In HDC/MPU 23, the HDC is a logic circuit and the MPU acts according to firmware loaded into the RAM 24. Data necessary for the controlling and the data processing are loaded into the RAM 24. HDC/MPU 23 is an example of a controller and performs control of the HDD 1 in addition to other processes associated with data processing, such as: head-slider positioning control, interface control, and defect management. In accordance with an embodiment of the present invention, HDC/MPU 23 controls the execution of SSW and carries out the clearance measurement for the clearance control in SSW.

In accordance with an embodiment of the present invention, SSW is mainly divided into an initial process and a subsequent self-propagation process. In accordance with an embodiment of the present invention, SSW includes the clearance measurement for the head-sliders in the initial process. Before describing the clearance measurement in detail, the self-propagation process is next described. The self propagation process reads out servo patterns on the magnetic-recording disk 11 with a read element on a head-slider 12 and positions the head-slider 12 to a target position, and then writes new servo patterns onto the magnetic-recording disk 11 with a write element on the head-slider 12.

Repeating the process, the self propagation process writes servo patterns on the recording surface. The read element and the write element are disposed at different radial positions. Thus, the write element can write new servo patterns while the read element, at a different radial position from the write element, tracks servo patterns previously written by the write element.

In accordance with an embodiment of the present invention, in servo writing, HDD 1 selects one of the head-sliders 12 and reads servo patterns on the recording surface with the selected head-slider 12. As described herein, the head-slider 12 is referred to by the term of art, "propagation head." HDD 1 controls the actuator 16 by use of servo signals read by the propagation head and writes servo patterns simultaneously on the recording surfaces with all the head-sliders including the propagation head. HDD 1 greatly reduces the processing time for the SSW process.

With reference now to FIG. 2(a), in accordance with an embodiment of the present invention, a drawing is shown that illustrates a magnetic-recording head 122 on the head-slider 12 and servo patterns on the magnetic-recording disk 11 in the self-propagation process. FIG. 2(a) illustrates three product servo pattern sectors 117. The rotational direction of the magnetic-recording disk 11 is the direction from the right to the left on FIGS. 2(a) and 2(b). The magnetic-recording head 122 includes the read element 32 and the write element 31. In accordance with an embodiment of the present invention, HDD 1 writes patterns from the ID side, the "inner side," of the magnetic-recording disk side to the OD side, the "outer side," of the magnetic-recording disk in the self-propagation process. In another embodiment of the present invention, the HDD 1 may write patterns from the OD to the ID.

In FIG. 2(a), the read element 32 is located closer to the ID of the magnetic-recording disk 11 than the write element 31. Servo patterns are written from the ID to the OD. Writing the servo patterns from the ID to the OD allows the read element 32 to read servo patterns previously written by the write element 31. Thus, the write element 31 can write new servo patterns towards the OD while positioning the head-slider 12 by use of servo patterns read by the read element 32.

As described herein, the radial spacing between the write element 31 and the read element 32 is referred to by the term of art, "read-write offset." Specifically, the read-write offset indicates the radial spacing on the magnetic-recording disk 11 between the centers of the write element 31 and the read element 32. The read-write offset varies depending on the radial position of the magnetic-recording head 122 in proximity with the recording surface of the magnetic-recording disk 11.

In this embodiment, HDD 1 performs the positional control using servo patterns of the same format as product servo patterns used in operations responsive to commands from a host. HDD 1 makes it possible to carry out SSW by use of functions implemented in product HDD 1. Otherwise, HDD 1 may write servo patterns and timing patterns dedicated to SSW, in addition to product servo patterns, to write the product servo patterns, as well as the servo patterns and the timing patterns dedicated to the SSW.

Figure 2:
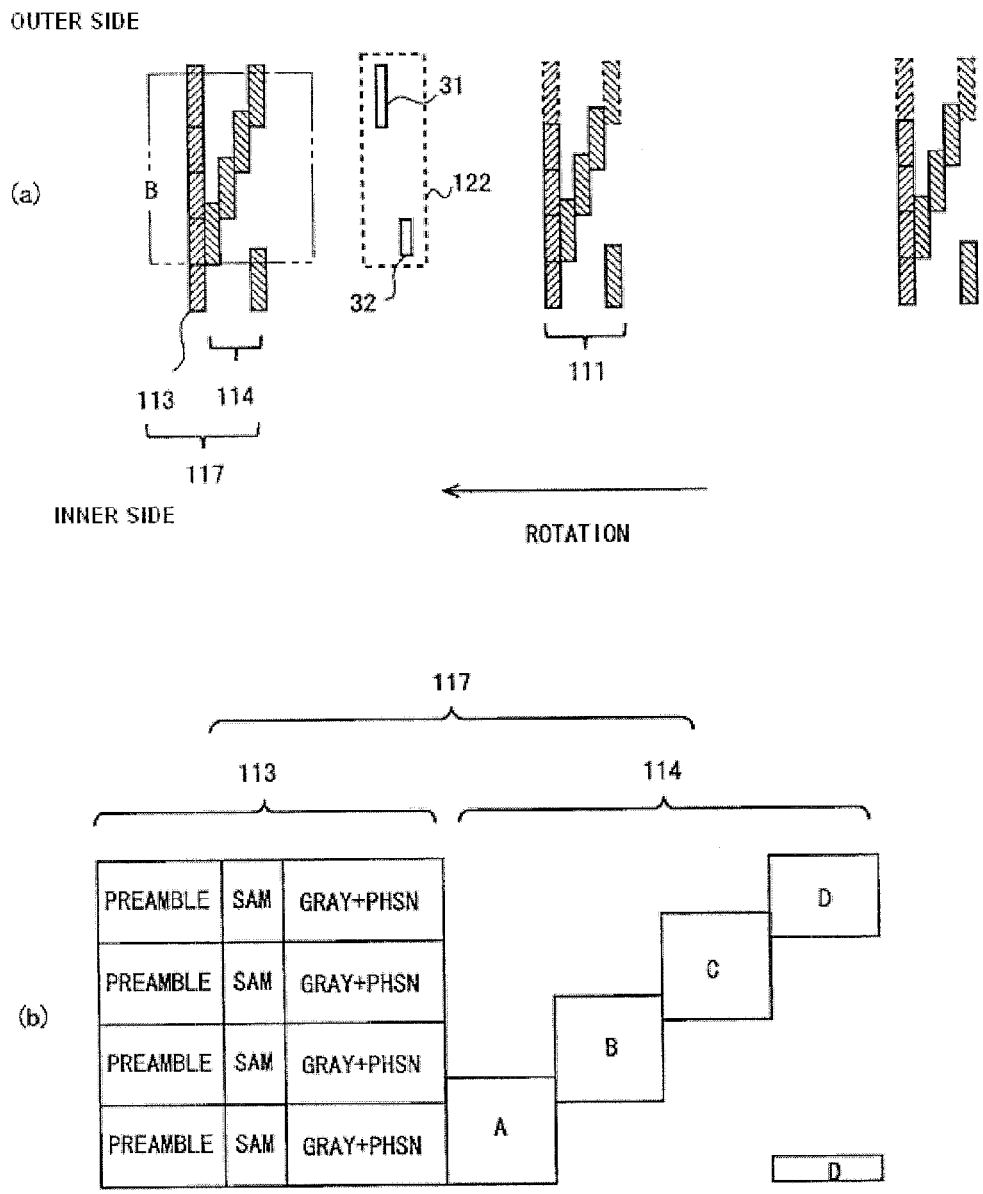
FIGS. 2(a) and 2(b) are drawings that illustrate a magnetic-recording head on a head-slider and servo patterns on a magnetic-recording disk in a self propagation process, in accordance with an embodiment of the present invention.

For writing new servo patterns, servo patterns for the accurate positioning of the magnetic-recording head 122 and timing patterns which are references of the timing of writing the new patterns are utilized. In FIG. 2(*a*), servo patterns are the product servo patterns 117, which are patterns of the same format as the product servo patterns, and each of the servo patterns includes a servo information portion 113 and burst portion 114.

With reference now to FIG. 2(*b*), in accordance with an embodiment of the present invention, a drawing is shown that shows the pattern format of a portion in the rectangle B in FIG. 2(*a*). FIG. 2(*b*) depicts radially arranged patterns in four servo tracks. HDD 1 writes multiple product servo pattern sectors 117 separate in the circumferential direction in a track. The sectors are continuous in the radial direction. The servo information portion 113 of the product servo pattern 117, as known in the art, includes fields of: the preamble (PREAMBLE), the servo address mark (SAM), the track identification of gray code (GRAY), and the servo sector number (PHSN). HDC/MPU 23 writes the next sector servo pattern with reference to SAM detection timing.

In the burst portion 114, patterns are written at four different circumferential positions. The write element 31 writes a single pattern in the burst portion 114 in a track. Each pattern has a width, which is a size in the radial direction, of the write element 31 and the patterns are displaced in the radial direction with respect to each other. The servo information portions 113 overlap partially in the radial direction.

As described above, in SSW, HDD 1 refers to patterns HDD 1 has written on the magnetic-recording disk 11 by itself and writes the next patterns at positions displaced by the read-write offset from the written patterns in the radial direction while performing the temporal control, which is timing control in the circumferential direction, and the spatial control, which is positional control in the radial direction, using the timing and spatial information gained from the signals of the servo patterns. The positioning in SSW generally uses only the burst portion 114 without using the track identification.

The description referring to FIG. 2(*a*) corresponds to the process executed by the propagation head. The other head-sliders 12 move in proximity with the corresponding recording surfaces with the actuator 16 positioned by servo control with the propagation head and write servo patterns concurrently with the propagation head. All the head-sliders write the same servo patterns onto the recording surfaces in the self-propagation.

As understood from the description referring to FIG. 2(*a*), for the self-propagation, the servo patterns arranged over the length corresponding to the read-write offset, which is a cluster pattern, have been written on the magnetic-recording disk 11. HDD 1 writes initial patterns for the self-propagation onto the magnetic-recording disk in the initial process.

In similar to fashion to self-propagation, the initial pattern writing process forms cluster patterns. Each cluster pattern is formed of a pattern, or alternatively, continuous patterns, written in phase in the radial direction to have the width of one increment, or more increments over several tracks, and each of the patterns has the same format as the product servo pattern. Furthermore, the process sequentially records new cluster patterns of the width extended by one increment while positioning the head-slider at the cluster patterns, which allows the process to faun finally the initial patterns of width larger than the read-write offset for self-propagation.

The operation for forming the initial patterns is carried out with the actuator 16 pushed into the inner crash stop 171, namely, the head-slider 12 positioned in proximity with the recording surface of the innermost area of the magnetic-recording disk 11. The reduction of the VCM current to reduce the pushing force causes the actuator 16, which is associated with head-slider 12, to move outward by the elastic force exerted by the inner crash stop 171.

Figure 3:
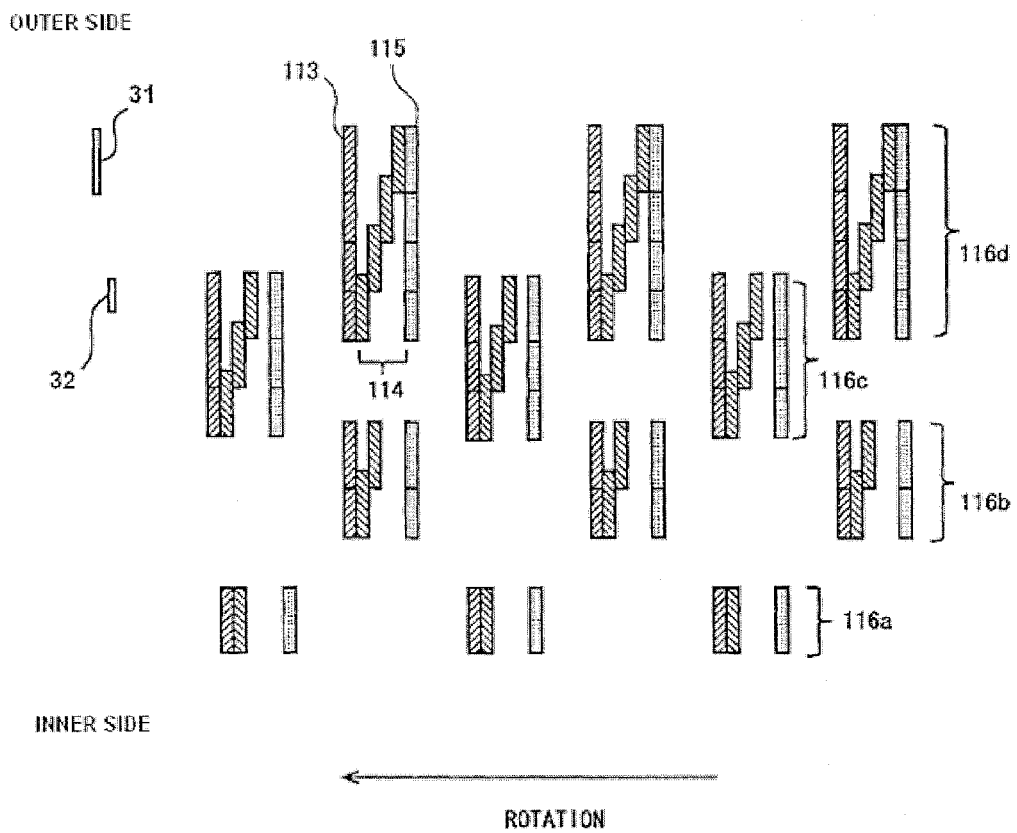
FIG. 3 is drawing that illustrates the arrangement of cluster patterns recorded in an innermost area on the magnetic-recording disk, in accordance with an embodiment of the present invention.

With reference now to FIG. 3, in accordance with an embodiment of the present invention, a drawing is shown that shows the configuration of the cluster patterns 116*a* to 116*d* recorded at the innermost area of the magnetic-recording disk 11. HDD 1 forms several tens to several hundreds of cluster pattern sectors in one rotation of the magnetic-recording disk 11. The number of the cluster pattern sectors may be the same as, or different from, that of the product servo pattern sectors formed at the end of the servo writing process. FIG. 3 illustrates three sectors of several hundreds of cluster pattern sectors in each servo track.

HDC/MPU 23 sequentially writes cluster patterns from the ID to the OD so as to increase the number of layers, which are associated with tracks, for example, one layer, two layers, by controlling the actuator 16 and the head-slider 12. First, HDC/MPU 23 writes the first cluster patterns 116*a*. Next, HDC/MPU 23 positions the read element 32 at the cluster patterns 116*a* and writes the second cluster patterns 116*b*. Each second cluster pattern is located closer to the OD of the magnetic-recording disk than, and separated from, each first cluster pattern by the read-write offset. HDC/MPU 23 writes new patterns with the write element 31 while positioning the read element 32 at two points each displaced slightly from the center of the cluster pattern 116*a*, such that the two points are associated with an inner edge and an outer edge, respectively. Thus, in one embodiment of the present invention, HDC/MPU 23 forms the second cluster pattern of two layers 116*b* from the first cluster pattern of a single layer 116*a*.

Similarly, HDC/MPU 23 positions the read element 32 at the second cluster patterns 116*b* to write the third cluster patterns 116*c* by use of the write element 31. Furthermore, HDC/MPU 23 positions the read element 32 at the third cluster patterns 116*c* to write the fourth cluster patterns 116*d*. In this way, the width, which is size in the radial direction, of the cluster pattern is extended by increasing the number of layers, which are associated with tracks.

In the example of FIG. 3, the fourth cluster pattern 116*d* covers the width of read-write offset. HDC/MPU 23 can use the fourth cluster patterns 116*d* as the initial patterns for self-propagation. Typically, HDC/MPU 23 uses cluster patterns much longer than the read-write offset as the initial patterns at the beginning of self-propagation.

After writing the initial patterns, HDC/MPU 23 measures the clearance of each head-slider 12. In one embodiment of the present invention, the clearance measurement for head-sliders is carried out with the actuator 16 being separated from the inner crash stop 171. If the actuator 16 is pushed into the inner crash stop 171, precise positioning by servo control is difficult. As the initial patterns over the read-write offset have been already written on the recording surface of the magnetic-recording disk 11, HDC/MPU 23 can position the actuator 16, which is associated with head-slider 12, at a designated location by servo control.

In accordance with an embodiment of the present invention, HDD 1 is equipped with a mechanism to adjust the clearance of each head-slider 12. As mechanisms to adjust the clearance, a mechanism with a piezoelectric element and a mechanism with a heater embedded in the head-slider 12 are known in the art. Embodiments of the present invention are applicable to HDDs with a clearance adjustment mechanism. In one embodiment of the present invention, the HDD 1 which adjusts the clearance of the head-slider 12 with a heater element is next described.

The HDD 1 writes servo patterns concurrently with all the head-sliders 12 in the self-propagation of SSW. In order to control the clearance for each head-slider 12 in SSW, the AE module 13 is configured to be able to supply heater power to each head-slider 12 independently.

Figure 4:
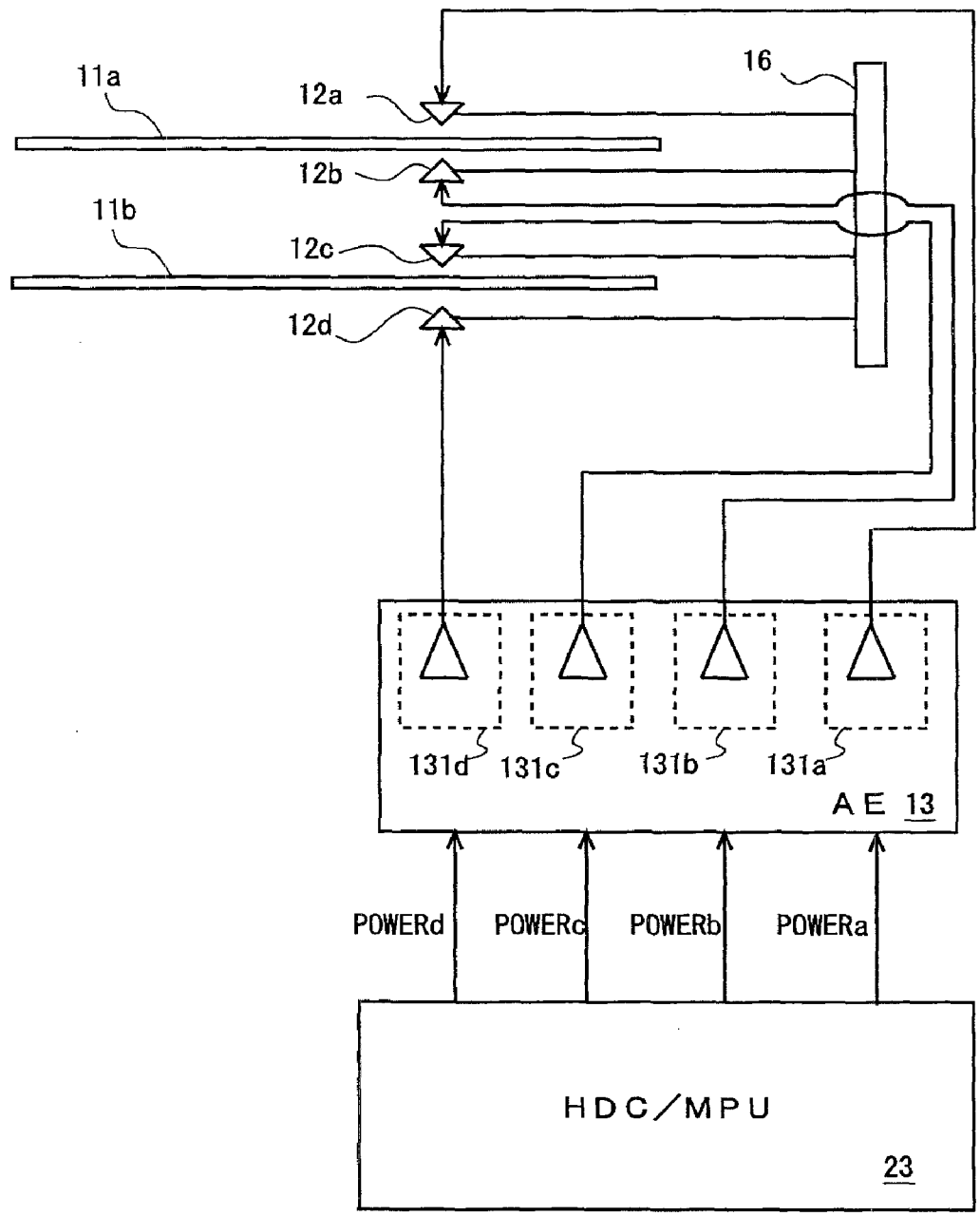
FIG. 4 is a block diagram schematically illustrating the configuration relating to clearance control in a HDD, in accordance with an embodiment of the present invention.

With reference now to FIG. 4, in accordance with an embodiment of the present invention, a drawing is shown that schematically illustrates a configuration associated with the clearance control. Four head-sliders 12a to 12d and two magnetic-recording disks 11a and 11b are exemplified in FIG. 4. The AE module 13 employs heater power supply circuits 131a to 131d corresponding to the head-sliders 12a to 12d, respectively, and is capable of adjusting the heater power to the head-sliders 12a to 12d independently. The heater power for the head-sliders 12a to 12d is controlled by HDC/MPU 23.

HDC/MPU 23 sets heater power values (POWERa to POWERd) associated with the head-sliders 12a to 12d, respectively, in a register of the AE module 13. The AE module 13 supplies the head-sliders 12a to 12d with heater power according to set control data. Although the AE module 13, in one embodiment of the present invention, includes respective heater power supply circuits associated with the head-sliders 12a to 12d, AE module 13 may also supply heater power to the head-sliders 12a to 12d sequentially with one heater power circuit to control each clearance independently, in another embodiment of the present invention.

Figure 5:
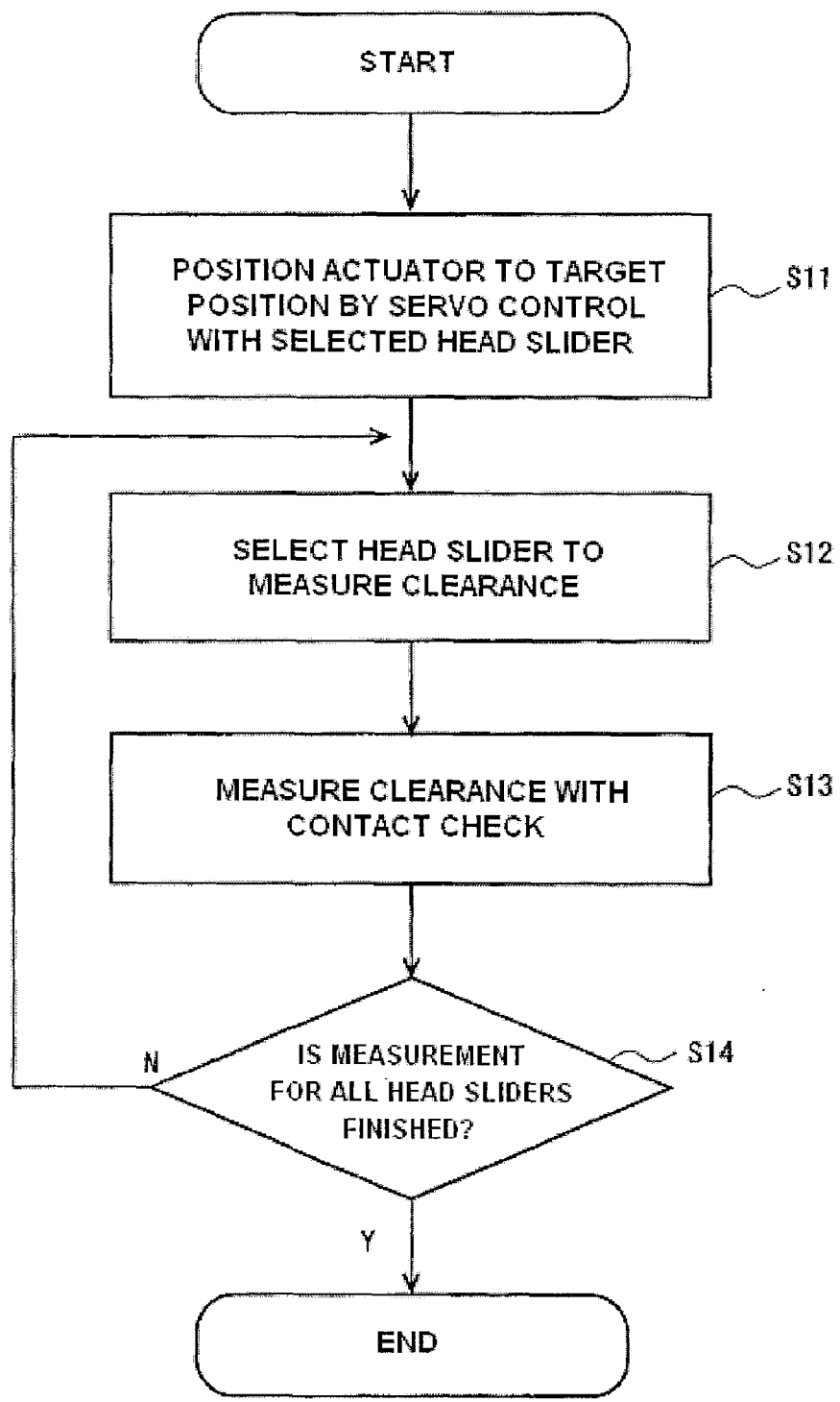
FIG. 5 is a flowchart showing a clearance measurement method for each head-slider in the initial stage of self-servo writing (SSW), in accordance with an embodiment of the present invention.

With reference now to FIG. 5, in accordance with embodiments of the present invention, a flowchart is shown that shows a clearance measurement method for each head-slider in the initial stage of SSW. As shown in FIG. 5, at S11, HDC/MPU 23 selects one head-slider, for example, head-slider 12a, from the four head-sliders 12a to 12d and performs the servo control of the actuator 16 with the head-slider 12a. Furthermore, at S12 to S14, HDC/MPU 23 measures the clearances of all the head-sliders 12a to 12d while maintaining the servo control of the actuator 16 with the head-slider 12a. Thus, in accordance with embodiments of the present invention, HDC/MPU 23 reduces the processing time for the clearance measurement of all the head-sliders 12a to 12d.

Specifically, at S12, HDC/MPU 23 selects a head-slider of which clearance has not been measured from the four head-sliders 12a to 12d, and, at S13, measures the clearance of the head-slider. After finishing the measurement, at S14, HDC/MPU 23 determines whether a head-slider of which clearance has not been measured is left. If a head-slider of which clearance has not been measured is left (N-branch after S14), at S12, HDC/MPU 23 selects another head-slider of which clearance has not been measured. If the clearance measurement has been completed for all the head-sliders (Y-branch after S14), HDC/MPU 23 ends the clearance measurement process for all the head-sliders.

In accordance with embodiments of the present invention, HDC/MPU 23 selects the propagation head as the head-slider for servo control in the clearance measurement, for example, the head-slider 12a in the above example. HDC/MPU 23 carries out tests for obtaining the characteristics of the head-sliders 12a to 12d before writing the initial patterns and selects a head-slider with a superior reproduction characteristic, for example, output of read-back signals, as the propagation head. Thus, in accordance with embodiments of the present invention, HDC/MPU 23 can perform more precise servo control in the clearance measurement.

Additionally, HDC/MPU 23 writes the initial patterns (refer to FIG. 3) under the servo control with the propagation head. Therefore, HDC/MPU 23 can move smoothly to the subsequent clearance measurement for the head-sliders, so that the processing time for the servo writing is reduced. Particularly, SSW which does not write the initial patterns with the head-sliders other than the propagation head may not write the new initial patterns. Accordingly, SSW which does not write the initial patterns with the head-sliders other than the propagation head has a large effect on reducing time in a servo-writing process.

At S13, HDC/MPU 23 detects contact between a head-slider and a magnetic-recording disk in the clearance measurement of the head-slider. As described hereinafter, the heater power for such an occasion is referred to by the term of art, "touchdown power." The touchdown power represents the clearance with heater off by a heater power value. Therefore, measurement of the touchdown power results in measurement of the clearance of a head-slider.

If HDC/MPU 23 performs servo control with a different head-slider than the head-slider for which the clearance measurement is carried out, accurate detection of contact of the head-slider for the clearance measurement with the magnetic-recording disk by monitoring read-back signals of the head-slider with which servo control is performed is difficult. In an embodiment of the present invention, the movement of the actuator 16 is detected due to the contact between the head-slider and the magnetic-recording disk. HDC/MPU 23 refers to the drive current value of the VCM 15 under servo control to detect the contact between the head-slider and the magnetic-recording disk.

HDC/MPU 23 attempts to maintain the head-slider for servo control at a target position, which is a radial position, during the clearance measurement of the selected head-slider. If the actuator 16, which is associated with the head-slider for servo control, is displaced from the target position because of the contact between the head-slider and the magnetic-recording disk, HDC/MPU 23 changes the drive current to the VCM 15 greatly in order to return the actuator 16 to the target position. HDC/MPU 23 provides the motor driver unit 22 with control data indicating the drive current to control the VCM 15. Thus, in accordance with embodiments of the present invention, HDC/MPU 23 is capable of detecting the change of the VCM drive current, namely the movement of the actuator 16 by monitoring the value of the control data.

Figure 6:
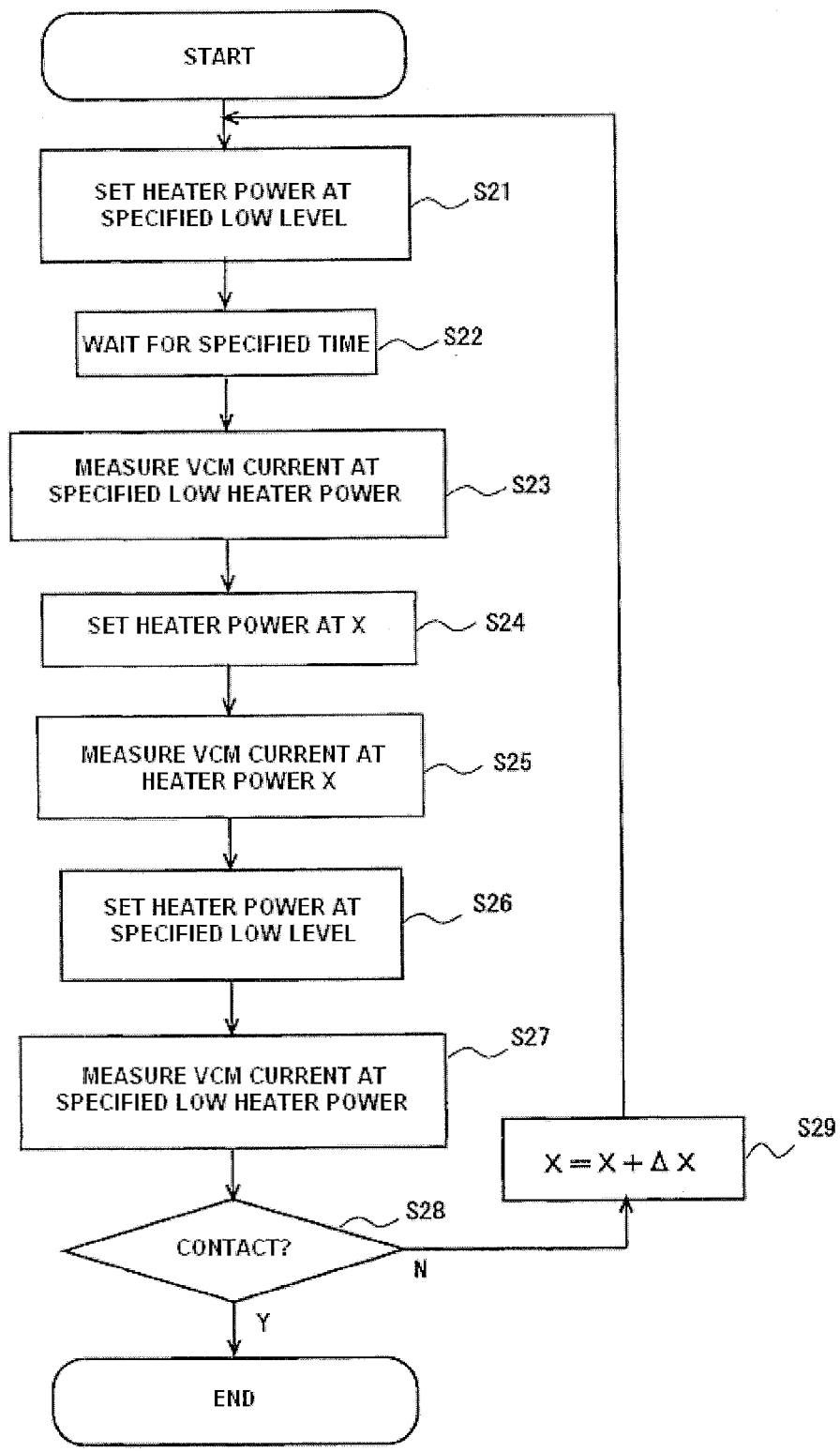
FIG. 6 is a flowchart showing an example method for detecting head-disk contact by monitoring VCM drive current, which provides control data thereof, in accordance with an embodiment of the present invention.

With reference now to FIG. 6, in accordance with embodiments of the present invention, a flowchart is shown that shows a method for detecting head-disk contact by monitoring the VCM drive current, which provides control data thereof. HDC/MPU 23 increases heater power in an incremental manner to determine whether the contact occurs at each heater power value. If HDC/MPU 23 detects the contact at any one of the heater values, HDC/MPU 23 registers the heater power value at which contact occurs as the touchdown power. As described above, the actuator 16 is positioned at the radial position until the touchdown power is determined.

As shown in FIG. 6, at S21, HDC/MPU 23 sets the heater power of a head-slider of which clearance is to be measured at a specified low level, which includes heater-off, and waits for a specified time to elapse, at S22. The specific standby time of HDC/MPU 23 is measured, for example, by rotation of the magnetic-recording disk 11; and, HDC/MPU 23 waits for several hundreds of rotations. HDC/MPU 23 allows the clearance measurement to avoid the effect of contact between a head-slider and a magnetic-recording disk, which can produce actuator vibration, in the previous measurement.

The specified heater power value to the object head-slider to be measured is at a level to reliably avoid the contact between the head-slider and the magnetic-recording disk. HDC/MPU 23 sets a heater power value for the object head-slider to be measured in the register of the AE module 13. The AE module 13 supplies the heater power to the heater of the object head-slider that the data indicates. HDC/MPU 23 supplies specified heater power, which includes heater-off, to the head-slider for servo control during the clearance measurement. The heater power value is small enough to reliably avoid the contact between the head-slider for servo control and the magnetic-recording disk.

Next, at S23, HDC/MPU 23 measures the value of VCM current control data at the specified heater power level. Specifically, HDC/MPU 23 obtains the VCM current control data for a specified time, for example, which may include several rotations of the magnetic-recording disk, and computes the average, which is the average A. Thus, HDC/MPU 23 gains an estimated value of the VCM current when the head-slider is not in contact with the magnetic-recording disk.

Next, at S24, HDC/MPU 23 sets the heater power value to the object head-slider to be measured at X. HDC/MPU 23 increases the X in stages to measure the touchdown power. In accordance with embodiments of the present invention, the first value of the X is small enough to reliably avoid the contact between the head-slider for servo control and the magnetic-recording disk and may be the same as the specified value in the operation S21. At S25, HDC/MPU 23 measures the values of the VCM current control data at the heater power X. This measurement is the same as the measurement method in the operation, at S23. This measurement allows HDC/MPU 23 to obtain the average, which is average B, of the VCM current control data, which corresponds to VCM current values, at the heater power X.

Then, at S26, HDC/MPU 23 sets the heater power of the head-slider for the clearance measurement at a specified small level, which includes heater-off. Typically, the heater power value is the same as the heater power value in the operation, at S23. Furthermore, at S27, HDC/MPU 23 measures the value of the VCM current control data at the specific heater power level. This measurement is the same as the measurement in the operation, at S23, and allows HDC/MPU 23 to obtain the average, which is average C, of the VCM current control data, which corresponds to VCM current values, with the head-slider not being in contact with the magnetic-recording disk.

At S28, HDC/MPU 23 makes a determination about the contact between the head-slider and the magnetic-recording disk based on the averages A, B and C. If the deference between the average A, C and the average B is larger than a specified value, HDC/MPU 23 determines that the contact between the head-slider and the magnetic-recording disk has occurred. Specifically, HDC/MPU 23 calculates: the average B−(the average A+the average C)/2, and determines that the contact has occurred if the value is larger than a specified value.

If HDC/MPU 23 determines that the contact between the head-slider and the magnetic-recording disk has not occurred (N-branch after S28), HDC/MPU 23 repeats the operations, from S21 to S28. On this occasion, at S29, HDC/MPU 23 increases the heater power value X for the contact check, which is associated with a variable in HDC/MPU 23, by a specified level. Accordingly, at S25, HDC/MPU 23 performs the contact check at smaller clearance in the next measurement. HDC/MPU 23 repeats the operations, from S21 to S28, until HDC/MPU 23 detects the contact between the head-slider and the magnetic-recording disk.

If HDC/MPU 23 detects the contact between the head-slider and the magnetic-recording disk (Y-branch after S28), HDC/MPU 23 registers the heater power value X on this occasion in a table in the RAM 24 as the touchdown power. The table stores the touchdown power for all the head-sliders 12a to 12d.

As described above, in an embodiment of the present invention, the non-contact VCM current value measurement, at S23 and/or S27, is performed before and after the measurement of the average B, at S25, for accurate contact determination. However, the non-contact VCM current value measurement may be limited to only one of the operations, which reduces the measurement time.

For accurate contact determination, in an embodiment of the present invention, the non-contact VCM current value measurement, at S23 and/or S27, is performed for each of the measurement events at the different heater power values X. However, the non-contact VCM current value measurement, at S23 and/or S27, may select a measurement head-slider and use the measurement value in the first non-contact VCM current value measurement repeatedly for the contact determination, at S28. Although in one embodiment of the present invention, the first measurement result is used until the contact is detected in order to reduce the measurement time, for the accurate determination, at S28, the non-contact VCM current value measurement may be performed once for every specified time of measurement at the heater power X, at S25.

HDC/MPU 23 selects a different head-slider sequentially and performs the measurement. In an embodiment of the present invention, target positions of the actuator 16, which determine positions of the head-slider for servo control, are the same in the measurement for all the head-sliders 12a to 12d, which eliminates the time for seek operations and, as a result, reduces the measurement time. Furthermore, since the VCM current characteristics are constant at the same target position, variations in the contact determination among the head-sliders are reduced. HDC/MPU 23 may measure the VCM current characteristics at the target position before the clearance measurement, and if the VCM current value varies greatly at a specific position, HDC/MPU 23 may change the target position, or alternatively, compensate for the variation in the clearance measurement.

In an embodiment of the present invention, the conditions for the clearance measurement are the same for all the head-sliders 12a to 12d. Specifically, the conditions for the clearance measurement include, for example: the heater power value of the servo control head-slider in the measurement, the target position of the servo control head-slider, the value of heater power X at the beginning of the contact measurement, and an increasing amount of the heater power X increased in a incremental manner. The conditions for the clearance measurement are the same for all the head-sliders 12a to 12d because the characteristics of each head-slider are not known in the servo writing and the behavior of each head-slider caused by the varied heater power is indefinite. The same measurement conditions for all the head-sliders reduce the possibility of errors in the clearance measurement.

After finishing the measurement for all the head-sliders 12a to 12d, HDC/MPU 23 moves to the product servo pattern writing process. In this process, HDC/MPU 23 supplies heater power calculated from the touchdown power obtained in the above-described measurement to each of the head-sliders 12a to 12d. Typically, HDC/MPU 23 provides each of the head-sliders 12a to 12d with heater power which is smaller than the touchdown power by a specified amount.

The heater power values may be maintained constant from the beginning to the end of the product servo pattern writing process or varied according to the radial position. HDC/MPU 23 is provided with a clearance profile, which is a functional relationship between the radial position and the clearance variation, and changes the heater power in accordance with the profile. The same profile determined in designing the HDD may be applied to all the head-sliders. HDC/MPU 23 may change the heater power according to detected temperature, which is the HDD temperature, by a temperature detector mounted on the HDD 1.

As set forth above, embodiments of the present invention are described by way of example; but, embodiments the present invention are not limited to the above-described examples and can, of course, be modified in various ways within the spirit and scope of embodiments of the present invention. For example, although embodiments of the present invention are useful for HDDs, embodiments of the present invention can also be applied to other types of disk drives. Embodiments of the present invention can be applied to HDDs with a plurality of head-sliders and the number of head-sliders is not restricted.

Although embodiments of the present invention are useful in contact measurement in SSW, embodiments of the present invention are applicable to contact measurement in other situations. For example, embodiments of the present invention may be applied to measurement of the touchdown power for each head-slider in test operations of a HDD. Although in accordance with the above-described embodiments of the present invention, the contact measurement is performed for all the head-sliders under servo control with a single head-slider, a plurality of head-sliders may be used for the servo control.

Moreover, embodiments of the present invention include a process to perform clearance measurement for a head-slider under servo control with another head-slider, as well as a process to perform clearance measurement for a plurality of head-sliders, in which the servo head-slider may be included, or may not be included, under servo control with a head-slider, which is useful when there is a possibility that a head-slider for clearance measurement may produce errors.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
   a plurality of head-sliders each comprising a slider and a magnetic-recording head on said slider for accessing a disk for storing data;
   an actuator to which said plurality of head-sliders are secured for moving said plurality of head-sliders concurrently;
   a plurality of clearance adjustment sections each corresponding to each head-slider of said plurality of head-sliders and configured to adjust a clearance of said corresponding head-slider; and
   a controller for positioning said actuator by servo control with at least two head-sliders selected from said plurality of head-sliders, for changing a clearance of a third head-slider different from said at least two head-sliders by controlling a clearance adjustment section of said third head-slider to bring said third head-slider into contact with a disk, and for detecting said contact to measure said clearance of said third head-slider.

2. The disk drive of claim 1, wherein said controller is further configured to measure a clearance of a fourth head-slider different from said at least two head-sliders and said third head-slider with said actuator positioned by servo control with said at least two head-sliders.

3. The disk drive of claim 1, wherein said controller is configured to measure clearances of said plurality of head-sliders with said actuator positioned by servo control with said at least two head-sliders.

4. The disk drive of claim 3, wherein said controller is configured to measure said clearances of said plurality of head-sliders with said actuator maintained positioned at a radial position.

5. The disk drive of claim 1, wherein said controller is configured to detect said contact by monitoring a value of current to a motor driving said actuator.

6. The disk drive of claim 1, wherein said controller is configured to perform and to control servo pattern writing to a disk with said plurality of head-sliders, to write product servo patterns indicating addresses of user data to said disk while controlling said actuator by servo control with a head-slider selected from said plurality of head-sliders, to perform a clearance measurement of said third head-slider before said writing of said product servo patterns, and to control said clearance adjustment section of said third head-slider according to said clearance measurement in writing said product servo patterns.

7. The disk drive of claim 6, wherein said actuator is configured to rotate on a pivot shaft to move said plurality of head-sliders, said controller is configured to start servo pattern writing with said actuator pushed into a crash stop defining a range of rotation of said actuator before starting to write said product servo patterns, and said controller is configured to perform said clearance measurement with said actuator being separated from said crash stop.

8. The disk drive of claim 6, wherein said controller is configured to write product servo patterns indicating addresses of user data to recording surfaces of respective magnetic-recording disks with said plurality of head-sliders while controlling said actuator by servo control with said at least two head-sliders.

9. A method for measuring a clearance of a head-slider in a disk drive equipped with a plurality of head-sliders and an actuator for holding and moving said plurality of head-sliders, said method comprising:
   selecting at least two head-sliders from a plurality of head-sliders;

positioning an actuator with servo signals said at least two head-sliders reads from a disk;

changing a clearance of a third head-slider different from said at least two head-sliders to bring said third head-slider in contact with a disk; and detecting said contact to measure said clearance of said third head-slider.

10. The method of claim 9, further comprising:

measuring a clearance of a fourth head-slider different from said at least two head-sliders and said third head-slider with said actuator positioned by servo control with said at least two head-sliders.

11. The method of claim 9, wherein clearances of said plurality of head-sliders are measured with said actuator positioned by servo control with said at least two head-sliders.

12. The method of claim 11, wherein said clearances of said plurality of head-sliders are measured with said actuator maintained positioned at a radial position.

13. The method of claim 9, wherein said contact is detected by monitoring a value of current to a motor driving said actuator.

14. A method for writing servo patterns on recording surfaces of respective magnetic-recording disks with a plurality of head-sliders in a disk drive equipped with said plurality of head-sliders and an actuator for holding and moving said plurality of head-sliders, said method comprising:

selecting at least two head-sliders from a plurality of head-sliders;

changing sequentially clearances of head-sliders of said plurality of head-sliders to bring said plurality of head-sliders into contact with a disk and detecting sequentially contacts of head-sliders of said plurality of head-sliders to measure said clearances of head-sliders of said plurality head-sliders, with an actuator positioned with servo signals that said at least two head-sliders reads from a disk;

writing product servo patterns indicating addresses of user data to a disk with said plurality of head-sliders concurrently while controlling said actuator by servo control with a head-slider selected from said plurality of head-sliders; and controlling said clearance of each of said head-sliders according to measurement of said clearance in writing said product servo patterns.

15. The method of claim 14, said at least two head-sliders is selected as said head-slider for servo control in writing of said product servo patterns.

16. The method of claim 14, wherein servo patterns for servo control of said actuator are written to said disk with said actuator pushed into a crash stop defining a range of rotation of said actuator before starting to write said product servo patterns, and said measurement of said clearance is performed with said actuator being separated from said crash stop.

17. The method of claim 14, wherein said clearances of head-sliders of said plurality of head-sliders are measured with said actuator maintained positioned at a radial position.

\* \* \* \* \*